United States Patent [19]

Obata et al.

[11] 4,294,396

[45] Oct. 13, 1981

[54] METHOD FOR MANUFACTURING BRAZED PARTS

[75] Inventors: Toshiharu Obata; Toshimasa Hagyu; Hisao Kojima, all of Kawasaki, Japan

[73] Assignee: Fuji Electric Co., Ltd., Kawasaki, Japan

[21] Appl. No.: 59,840

[22] Filed: Jul. 23, 1979

[30] Foreign Application Priority Data

Jul. 21, 1978 [JP] Japan .................................. 53-89257

[51] Int. Cl.³ .............................................. B23K 1/12
[52] U.S. Cl. ...................................... 228/245; 29/879
[58] Field of Search .................... 228/245, 56; 29/877, 29/879

[56] References Cited

U.S. PATENT DOCUMENTS

| | | | |
|---|---|---|---|
| 1,936,018 | 11/1933 | Hodgson | 228/245 |
| 2,568,242 | 9/1951 | Matteson, Jr. | 228/245 X |
| 2,625,737 | 1/1953 | Spooner | 29/879 |
| 2,984,893 | 5/1961 | Spooner | 29/877 |
| 3,472,365 | 10/1969 | Tiedema | 228/56 X |
| 3,744,129 | 7/1973 | Dewey, Jr. | 228/56 X |
| 3,941,299 | 3/1976 | Godfrey | 228/245 X |

Primary Examiner—Gil Weidenfeld
Assistant Examiner—Kenneth J. Ramsey
Attorney, Agent, or Firm—Sughrue, Mion, Zinn, Macpeak & Seas

[57] ABSTRACT

A method of manufacturing brazed parts by brazing a metal part with a base material made from a metal plate on which a pressing operation is accomplished at a work station. The base and filler materials are stamped with the filler material initially on top of the base material. A portion of the filler material is formed through and held in position in a through hole in the base material. The metal part and the base material are then brazed through the filler material.

5 Claims, 3 Drawing Figures

METHOD FOR MANUFACTURING BRAZED PARTS

BACKGROUND OF THE INVENTION

This invention relates to a method for manufacturing brazed parts.

In general, an automatic operation for brazing has been considered to be difficult. Particularly, a requirement exists for automation to supply a filler material. Heretofore, during the brazing operation the filler material has been supplied from the outside to between joint surfaces to be brazed. However, such a method is low in its productivity. Also, in order to improve productivity, it has been proposed and recently used to provide a coating layer of filler metal in advance on a joint surface of a base metal to be brazed. However, this method is disadvantageous in that a great deal of money is required for equipment and manufacturing.

SUMMARY OF THE INVENTION

Accordingly, an object of this invention is to eliminate the above-described drawbacks and to provide a method for manufacturing brazed parts which can be automatically and easily brazed.

Another object of this invention is to provide a method for manufacturing brazed parts that is economical and commercially feasible.

Briefly, these and other objects of this invention are attained in a method characterized in that in a method for manufacturing brazed parts accomplished by brazing a metal part with a base material made of a plate metal on which a work press can be applied. The method includes the steps of stamping out the base and filler materials with the filler material initially on top of the base material, and brazing the metal part with the base material through the filler material which is held within a through-hole formed in the base material.

This invention will be described with reference to the drawings and the description of the preferred embodiment that follows.

DETAILED DESCRIPTION OF THE INVENTION

Figure 1:
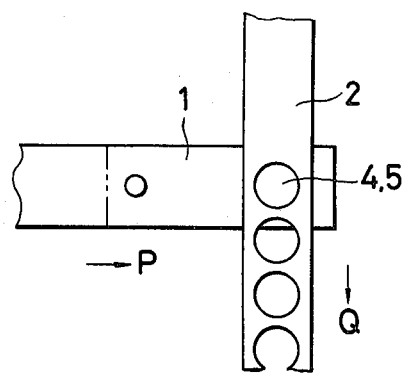
FIG. 1 is a plan view showing manufacturing method for brazed parts according to this invention.
Figure 2:
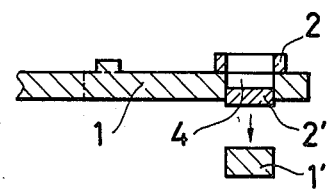
FIG. 2 is a longitudinally cross-sectional view of FIG. 1.
Figure 3:
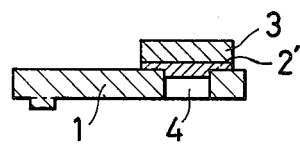
FIG. 3 is a longitudinally cross-sectional view showing a state of completion of the brazed parts according to this invention.

FIGS. 1 to 3 show a manufacturing method of brazed parts according to this invention. A base material 1 is made of a metal plate on which a work press can be applied. The base material 1 is automatically fed in the direction of the P arrow, keeping the not to be brazed surface upward. Also a plate-shaped filler material 2 is disposed on the front surface of the base material 1 and is automatically fed in the direction of the Q arrow perpendicular to the direction of the P arrow. When the base material 1 and the filler material 2 are fed respectively up to a work position to be brazed, both are simultaneously stamped out with size smaller than that of joint surface of a metal part 3, to be brazed. At this time, a piece of base material 1' is completely drawn off from the base material 1 so that a through-hole 4 can be formed.

On the other hand, a piece of filler material 2' is stamped out from the filler material 2 to be held within the through-hole 4. Thereafter, the filler material 2 is trimmed and then the unit is turned upside down to keep the surface to be brazed upward. Furthermore, the metal part 3 is put above the through-hole 4 and the filler material 2' is then heated. As described above, since the filler material 2' is held within the through-hole 4 on the side of the surface to be brazed, it can be easily melted and diffused between the joint surface between the base material and the metal part. As a result, the base material 1 and the metal part 3 are brazed.

Although the above description illustrates the case where the base material 1 and the filler material 2 are simultaneously stamped out, even if only the base material 1 is stamped out in advance to form the through-hole 4, the same effect can be obtained.

Thus, according to this invention, the brazing operation can be easily and automatically accomplished.

What is claimed is:

1. In a method for manufacturing brazed parts made by brazing a metal part with a base material made of a plate metal, the improvement comprising the steps of;

stamping out said base material to form a through-hole in said base material, stamping out said filler material and urging said filler material into said through-hole formed in said base material and held protruding outwardly therefrom, placing said metal part on said filler material and, brazing said metal part to said base material through said filler material.

2. The method of claim 1 wherein said base material and filler material are simultaneously stamped.

3. The method of claim 1 wherein said base material is stamped to form said through hole prior to stamping said filler material.

4. The method of claim 1 further comprising the steps of shaping the filler material and turning to have the surface to be brazed facing upward.

5. The method of claims 1, 2, 3, or 4, further comprising the steps of feeding base material to a work station in one direction and feeding filler material to said work station at a position above said base material.

* * * * *